(12) United States Patent
Sridhar

(10) Patent No.: US 6,609,543 B2
(45) Date of Patent: Aug. 26, 2003

(54) VESSEL FOR STORAGE AND DISTRIBUTION OF MATERIAL

(75) Inventor: Sidney Sridhar, Richmond (CA)

(73) Assignee: Seabulk Systems Inc., Richmond (CA)

( * ) Notice: Subject to any disclaimer, the term of this patent is extended or adjusted under 35 U.S.C. 154(b) by 0 days.

(21) Appl. No.: 09/911,377

(22) Filed: Jul. 25, 2001

(65) Prior Publication Data

US 2003/0019538 A1 Jan. 30, 2003

(51) Int. Cl.⁷ .............................. B65B 1/04; B65B 3/04; B65B 37/00; B67C 3/00
(52) U.S. Cl. ................... 141/242; 141/104; 141/192; 141/237; 414/137.9
(58) Field of Search ........................... 141/18, 94, 100, 141/192, 234, 237, 242, 104; 114/222, 256; 414/137.9, 138.1; 406/124, 187

(56) References Cited

U.S. PATENT DOCUMENTS

| | | | |
|---|---|---|---|
| 779,852 A | * 1/1905 | Holzapfel | ..................... 114/45 |
| 3,168,955 A | * 2/1965 | Black | ..................... 114/366 |
| 3,666,119 A | 5/1972 | Parsons | |
| 3,964,620 A | 6/1976 | Parsons | |
| 4,422,400 A | * 12/1983 | Burke | ..................... 114/73 |

* cited by examiner

Primary Examiner—Timothy L. Maust
(74) Attorney, Agent, or Firm—Elbie R. de Kock

(57) ABSTRACT

A vessel for use on land for the storage and distribution of material such as a dockside storage terminal, comprises a hull which is subdivided into a plurality of hoppers. Each hopper is provided with a discharge opening at a lower end thereof for the gravity discharge of material from the hopper. A passageway is provided in the hull below the discharge openings for the passage of transfer vehicles along the discharge openings for receiving material discharged from the discharge openings. The hull is floatable for transporting the vessel on water from a location of construction to a location of use.

13 Claims, 4 Drawing Sheets

VESSEL FOR STORAGE AND DISTRIBUTION OF MATERIAL

FIELD OF THE INVENTION

This invention relates to a vessel for the storage and distribution of material, such as for example, a dockside storage terminal for the transfer of cargo from a marine vessel to trucks or railcars.

BACKGROUND OF THE INVENTION

Unloading operations between marine vessels and dockside shipping yards can be complicated by various factors. For example, a particular type of marine vessel may be too large for a dockside unloading facility, or the nature of the cargo may be difficult to unload safely and economically, specifically into land-based vehicles.

SUMMARY OF THE INVENTION

According to the invention there is provided a vessel for use on land for the storage and distribution of material, comprising a hull which is subdivided into a plurality of hoppers, each hopper being provided with a discharge opening at a lower end thereof for the gravity discharge of material therefrom, wherein the hull is floatable for transporting the vessel on water from a location of construction to a location of use, a passageway in the hull below said discharge openings for the passage of transfer vehicles along said discharge openings for receiving material discharged from the discharge openings; and discharge control means for controlling discharge of particulate material into said transfer vehicles.

Further objects and advantages of the invention will become apparent from the description of preferred embodiments of the invention below.

BRIEF DESCRIPTION OF THE DRAWINGS

The invention will now be described, by way of example, with reference to the accompanying drawings, in which.

DETAILED DESCRIPTION OF THE PREFERRED EMBODIMENT

Figure 1:
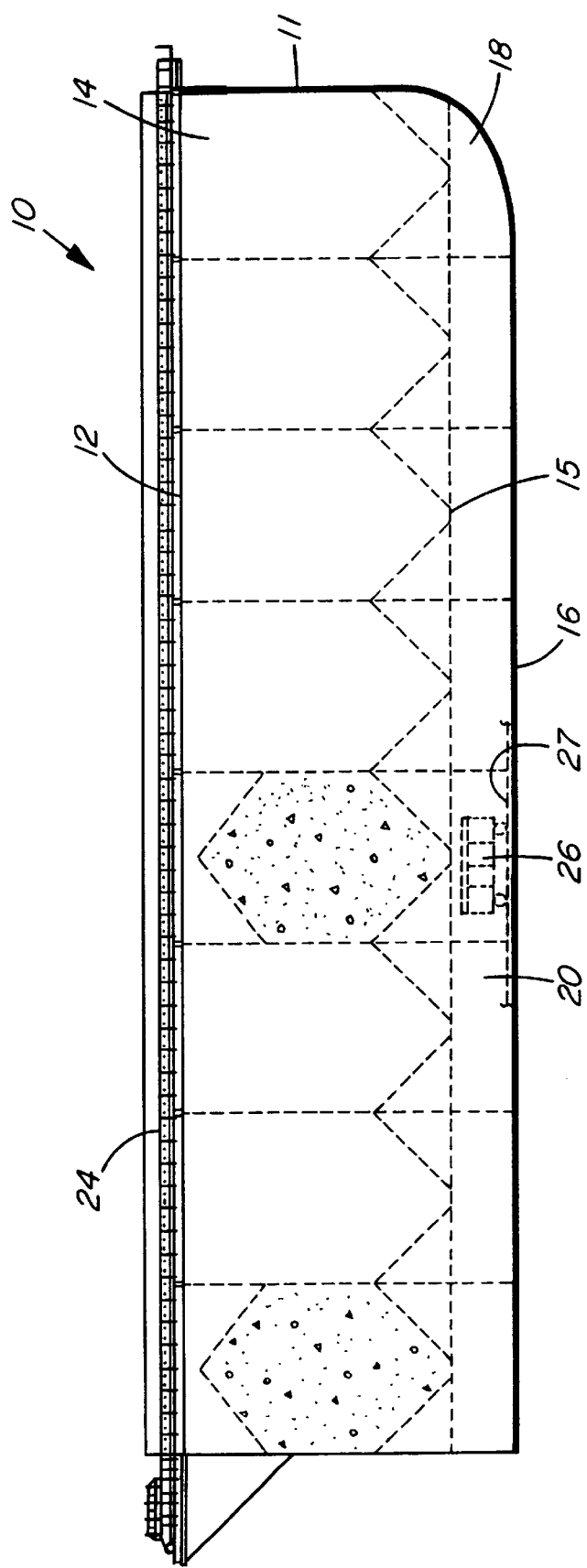
FIG. 1 is a side view of a dockside storage terminal according to the invention.
Figure 2:
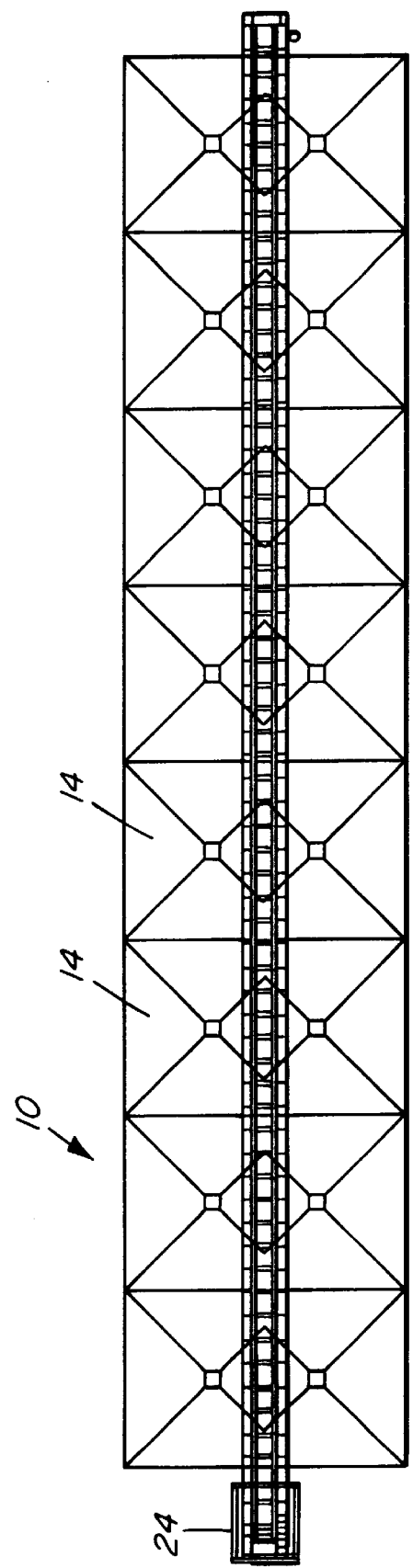
FIG. 2 is a plan view of the dockside storage terminal of FIG. 1.
Figure 3:
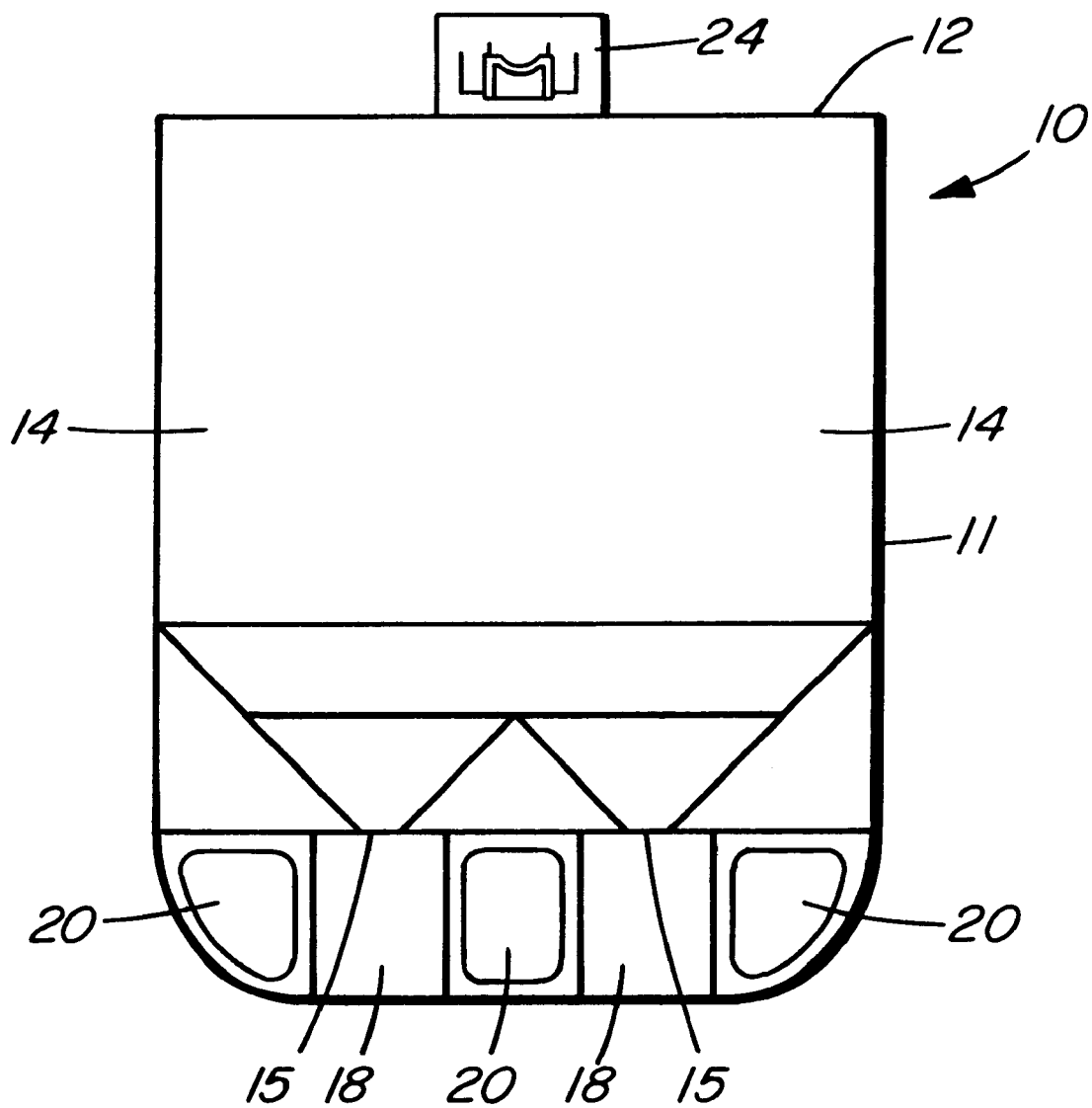
FIG. 3 is an end view of the dockside storage terminal of FIG. 1.

In the drawings, reference numeral 10 generally indicates a dockside storage terminal which comprises a hull 11 provided with an upper deck 12. The hull 11 is divided into a number of separate cargo holds or hoppers 14. In the present example, eight of the hoppers 14 are provided. Each hopper 14 has a pair of discharge openings 15 at its lower end for the gravity discharge of material therefrom. Each discharge opening 15 is provided with an automated bulk flow gate 16 for opening and closing the discharge opening 15. As can be seen, the discharge openings 15 are arranged in two parallel rows extending along the length of the hull 11.

A pair of tunnels or passageways 18 is provided in the lower part of the hull 11. The passageways 18 are located below the discharge openings 15 and each passageway 18 extends along one of the rows of discharge opening 15.

A tripper conveyor 24 is provided on the upper deck 12 for discharging cargo into the hoppers 14.

The hull 11 is designed as a barge with internal water-tight bulkheads 20 so that the storage terminal 10 can be transported by water from a construction yard to a location where it is to be installed for use.

The passageways 18 are designated for limited ballast capacity while the terminal 10 is in transit to its point of installation. Post transit, the passageways 18 can undergo modifications to function as traffic aisles for transfer vehicles.

For the purpose of the initial voyage from the construction yard to the point of shore installation, the terminal 10 is equipped with a battery-operated light mast, basic lighting arrangements, and the required signal equipment (not shown). The terminal 10 is also built to have the minimum vertical clearance height for passing under major spans on rivers and major ports of prospective operation. Although the terminal 10 is designed for a single voyage from the site of its construction to the point of installation, it may be modified for additional voyages, such as to a new site of operation.

The terminal 10 may be designed and built to suit the specific requirements of the dockside shipping yard of its intended use. It may be provided with further components such as electrical, hydraulic, and cargo control systems. Walkways complete with safety railings, and ladders and rungs for access to the hopper interiors may also be provided.

Once built, the terminal 10 is towed to the site of installation and is lifted out of the water with a semi-submersible barge. The terminal 10 is then installed on fixed concrete foundations 22 on the prepared site for operation as an automated storage and discharge facility.

Figure 4:
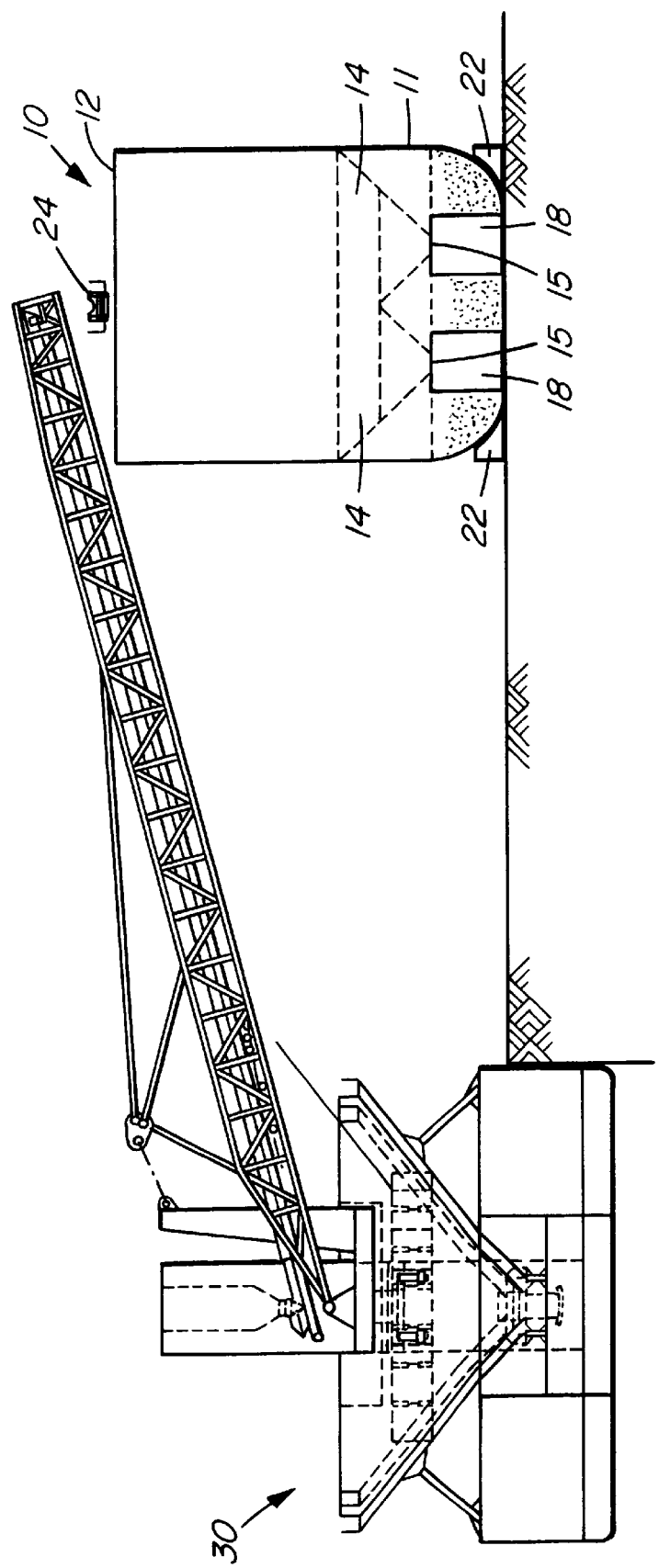
FIG. 4 shows a marine transfer vessel loading material into the dockside storage terminal of FIG. 3.

After installation, the terminal 10 is capable of receiving transshipped cargo from marine self-unloaders 30, as depicted in FIG. 4. Material from the marine self-unloader 30 is loaded onto the tripper conveyor 24 for distribution into a designated hopper 14.

The material is stored in the hoppers 14 until transfer vehicles arrive for further transport operations. A transfer vehicle, such as a pick-up truck or railcar 26 on tracks 27 enters the terminal 10 at one end of the hull 11, through one of the passageways 18. The transfer vehicle is regulated by an automated traffic system within the terminal tunnel 18 similar to a traffic system of conventional roadways. The automated twin gates 16 located transversely on the bottom of the hopper 14 are programmed to open and close for a specified time in order to allow gravity discharge of cargo material, such as aggregate or particulate material, into the receiving storage area of the service vehicle. The vehicle will be signaled to stop and park at a red light, where it is directly positioned under one of the discharge openings 15 of a particular hopper 14. While the service vehicle is parked, the relevant gate 16 will open, allowing the correct amount of material to be discharged into the service vehicle before it closes again. Once the discharge operation is complete, the traffic light turns green to indicate to the driver of the vehicle to continue through the passageway 18 and exit at the opposite end of the terminal 10.

All operations within the terminal 10 are controlled by an automated computer network system which is activated from a quarry office or a similar separate module. Data between the terminal 10 and the quarry office is delivered by means of a communication loop within the network. This allows for a more efficient, safer and economical intermodal transfer of material from marine transfer vessels to land vehicles.

Although certain preferred embodiments of the present invention have been shown and described in detail, it should be understood that various changes and modifications may be made therein without departing from the scope of the appended claims.

What is claimed is:

1. A vessel for use on land for the storage and distribution of material, comprising:

a hull which is subdivided into a plurality of hoppers, each hopper being provided with a discharge opening at a lower end thereof for the gravity discharge of material therefrom, wherein the hull is floatable for transporting the vessel on water from a location of construction to a location of use, a passageway in the hull below said discharge openings being adapted for the passage of transfer vehicles along said discharge openings for receiving material discharged from the discharge openings; and discharge control means for controlling discharge of particulate material into said transfer vehicles, wherein the transfer vehicles are railcars, the passageway being provided with tracks for use by the railcars.

2. The storage vessel according to claim 1, wherein the location of use is on a dockside.

3. The storage vessel according to claim 1, further comprising a conveyor above said hoppers for receiving material to be stored in said hoppers and for conveying material for discharge into said hoppers.

4. The storage vessel according to claim 1, wherein each hopper is provided with a pair of discharge openings for independent discharge into separate transport vehicles, said pairs of discharge openings forming two adjacent rows of discharge openings, and wherein one said passageway is provided for each row of discharge openings.

5. The storage vessel according to claim 4, wherein said discharge openings are provided with gates for opening and closing the discharge openings and said control means includes activators for remote activation of said gates.

6. The storage vessel according to claim 1, wherein said control means includes sensors for sensing the presence of a transfer vehicle beneath a particular one of said discharge openings and an activator for opening the gate of said particular discharge opening when the presence of a transfer vehicle is sensed.

7. A vessel for use on land for the storage and distribution of material, comprising:

a hull which is subdivided into a plurality of hoppers, each hopper being provided with a discharge opening at a lower end thereof for the gravity discharge of material therefrom, wherein the hull is floatable for transporting the vessel on water from a location of construction to a location of use, a passageway in the hull below said discharge openings being adapted for the passage of transfer vehicles along said discharge openings for receiving material discharged from the discharge openings; and discharge control means for controlling discharge of particulate material into said transfer vehicles, wherein each hopper is provided with a pair of discharge openings for independent discharge into separate transport vehicles, said pairs of discharge openings forming two adjacent rows of discharge openings, and wherein one said passageway is provided for each row of discharge openings.

8. The storage vessel according to claim 7, wherein the transfer vehicles are railcars, the passageway being provided with tracks for use by the railcars.

9. The storage vessel according to claim 7, wherein said discharge openings are provided with gates for opening and closing the discharge openings and said control means includes activators for remote activation of said gates.

10. A vessel for use on land for the storage and distribution of material, comprising:

a hull which is subdivided into a plurality of hoppers, each hopper being provided with a discharge opening at a lower end thereof for the gravity discharge of material therefrom, wherein the hull is floatable for transporting the vessel on water from a location of construction to a location of use, a passageway in the hull below said discharge openings being adapted for the passage of transfer vehicles along said discharge openings for receiving material discharged from the discharge openings; and discharge control means for controlling discharge of particulate material into said transfer vehicles, wherein said control means includes sensors for sensing the presence of a transfer vehicle beneath a particular one of said discharge openings and an activator for opening the gate of said particular discharge opening when the presence of a transfer vehicle is sensed.

11. The storage vessel according to claim 10, further comprising a conveyor above said hoppers for receiving material to be stored in said hoppers and for conveying material for discharge into said hoppers.

12. The storage vessel according to claim 10, wherein each hopper is provided with a pair of discharge openings for independent discharge into separate transport vehicles, said pairs of discharge openings forming two adjacent rows of discharge openings, and wherein one said passageway is provided for each row of discharge openings.

13. The storage vessel according to claim 12, wherein said discharge openings are provided with gates for opening and closing the discharge openings and said control means includes activators for remote activation of said gates.

* * * * *